United States Patent [19]

Matsen

[11] Patent Number: 5,700,995
[45] Date of Patent: Dec. 23, 1997

[54] SUPERPLASTICALLY FORMED PART

[75] Inventor: Marc R. Matsen, Seattle, Wash.

[73] Assignee: The Boeing Company, Seattle, Wash.

[21] Appl. No.: 406,349

[22] Filed: Mar. 17, 1995

Related U.S. Application Data

[60] Division of Ser. No. 151,433, Nov. 12, 1993, Pat. No. 5,420,400, which is a continuation-in-part of Ser. No. 777,739, Oct. 15, 1991, Pat. No. 5,410,132.

[51] Int. Cl.$^6$ .................................................... B23K 13/01
[52] U.S. Cl. ........................ 219/615; 219/609; 219/645
[58] Field of Search ................................ 219/600–604, 219/609, 615–618, 659, 673, 676, 635, 645; 29/17.2; 228/157, 173.2, 190, 193; 72/60; 428/593

[56] References Cited

U.S. PATENT DOCUMENTS

| | | | |
|---|---|---|---|
| 2,984,732 | 5/1961 | Herbert | 219/78.12 |
| 3,110,961 | 11/1963 | Melill et al. | 228/181 |
| 3,444,275 | 5/1969 | Willett | 264/26 |
| 3,466,726 | 9/1969 | Savolainen | 228/118 |
| 3,529,458 | 9/1970 | Butler et al. | 72/60 |
| 3,547,751 | 12/1970 | Morgan | 428/188 |
| 3,595,060 | 7/1971 | Hundy | 72/364 |
| 3,605,477 | 9/1971 | Carlson | 72/342.4 |
| 3,661,491 | 5/1972 | Troyer | 425/297 |
| 3,705,284 | 12/1972 | Binard | 219/634 |
| 3,890,819 | 6/1975 | DeLuca | 72/57 |
| 3,895,436 | 7/1975 | Summers et al. | 228/157 |
| 3,920,175 | 11/1975 | Hamilton et al. | 228/173.2 |
| 3,924,793 | 12/1975 | Summers et al. | 228/157 |
| 3,927,817 | 12/1975 | Hamilton et al. | 228/157 |
| 3,934,441 | 1/1976 | Hamilton et al. | 72/60 |
| 3,974,673 | 8/1976 | Fosness et al. | 72/38 |
| 4,060,364 | 11/1977 | Gras | 425/174 |
| 4,111,024 | 9/1978 | Dahlman et al. | 72/60 |
| 4,117,970 | 10/1978 | Hamilton et al. | 228/173.2 |
| 4,141,484 | 2/1979 | Hamilton et al. | 228/265 |
| 4,145,903 | 3/1979 | Leach et al. | 72/60 |
| 4,150,927 | 4/1979 | Steingroever | 425/3 |
| 4,188,811 | 2/1980 | Brimm | 72/63 |
| 4,217,397 | 8/1980 | Hayase et al. | 428/594 |
| 4,233,829 | 11/1980 | Hamilton et al. | 72/38 |
| 4,233,831 | 11/1980 | Hamilton et al. | 72/60 |
| 4,269,053 | 5/1981 | Agrawal et al. | 72/42 |
| 4,292,375 | 9/1981 | Ko | 428/593 |
| 4,304,821 | 12/1981 | Hayase et al. | 428/593 |
| 4,306,436 | 12/1981 | Schulz et al. | 72/21 |
| 4,331,284 | 5/1982 | Schulz et al. | 228/157 |
| 4,352,280 | 10/1982 | Ghosh | 72/38 |
| 4,393,987 | 7/1983 | Anderson et al. | 228/157 |
| 4,474,044 | 10/1984 | Leistner et al. | 72/13 |
| 4,524,037 | 6/1985 | Marc | 264/26 |
| 4,530,197 | 7/1985 | Rainville | 52/797 |
| 4,544,339 | 10/1985 | Itoh | 425/174.8 R |
| 4,555,373 | 11/1985 | Bloemkolk et al. | 264/25 |
| 4,563,145 | 1/1986 | de Meij | 425/174.8 R |
| 4,584,860 | 4/1986 | Leonard | 72/61 |
| 4,603,089 | 7/1986 | Bampton | 428/593 |
| 4,603,808 | 8/1986 | Stacher | 228/265 |
| 4,622,445 | 11/1986 | Matsen | 219/615 |
| 4,635,461 | 1/1987 | Raymond | 228/6.1 |
| 4,649,249 | 3/1987 | Odor | 219/659 |
| 4,657,717 | 4/1987 | Cattanach et al. | 264/102 |
| 4,706,361 | 11/1987 | Meyer et al. | 29/423 |

(List continued on next page.)

FOREIGN PATENT DOCUMENTS 1418327  12/1975  United Kingdom.

*Primary Examiner*—Tu B. Hoang
*Attorney, Agent, or Firm*—John C. Hammar

[57] ABSTRACT

Multisheet SPF parts with braze joints at selected locations are produced with improved energy efficiency and at lower cost by heating the multisheet pack to its superplastic forming range below the melting point of the braze alloy, superplastically forming the pack to define braze joints having unmelted braze alloy; increasing the temperature to the braze temperature of the braze alloy, and cooling the pack below the superplastic range to freeze the braze alloy in the braze joint.

9 Claims, 3 Drawing Sheets

U.S. PATENT DOCUMENTS

| | | | |
|---|---|---|---|
| 4,713,953 | 12/1987 | Yavari | 72/60 |
| 4,716,072 | 12/1987 | Kim | 428/212 |
| 4,824,617 | 4/1989 | Takeuchi et al. | 264/26 |
| 4,855,011 | 8/1989 | Legge et al. | 156/583.1 |
| 4,882,823 | 11/1989 | Weisert et al. | 29/6.1 |
| 4,888,973 | 12/1989 | Comley | 72/342.92 |
| 4,889,276 | 12/1989 | Cadwell et al. | 228/265 |
| 4,901,552 | 2/1990 | Ginty et al. | 72/60 |
| 4,906,172 | 3/1990 | Stewart | 425/174.4 |
| 4,951,491 | 8/1990 | Lorenz | 72/60 |
| 4,984,348 | 1/1991 | Cadwell | 29/423 |
| 4,988,037 | 1/1991 | Cadwell | 228/265 |
| 5,024,369 | 6/1991 | Froes et al. | 228/157 |
| 5,032,327 | 7/1991 | Becheret | 264/26 |
| 5,047,605 | 9/1991 | Ogden | 219/633 |
| 5,064,978 | 11/1991 | Scholz | 219/605 |
| 5,093,545 | 3/1992 | McGaffigan | 219/616 |
| 5,115,963 | 5/1992 | Yasui | 228/157 |
| 5,118,026 | 6/1992 | Stacher | 228/157 |
| 5,139,407 | 8/1992 | Kim et al. | 425/174.8 |
| 5,141,146 | 8/1992 | Yasui | 228/157 |
| 5,229,562 | 7/1993 | Burnett et al. | 219/602 |

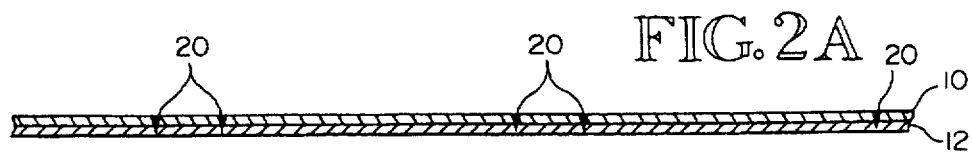
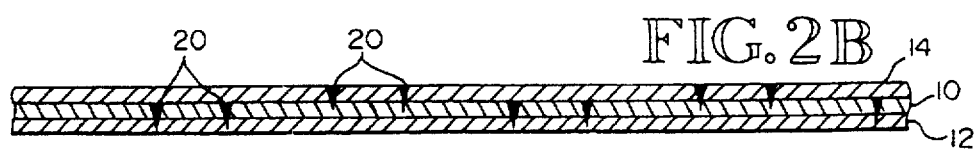
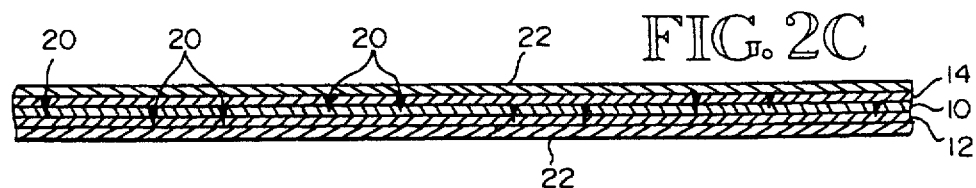
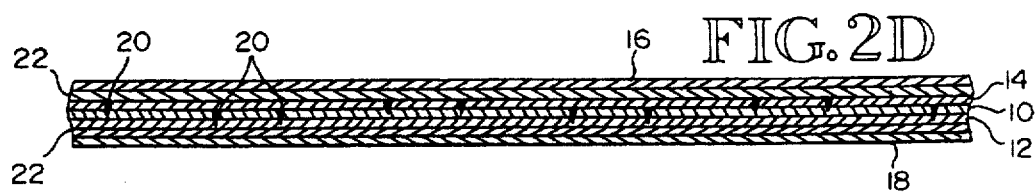
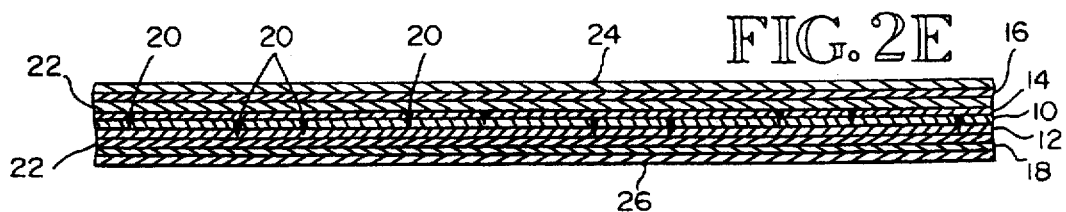
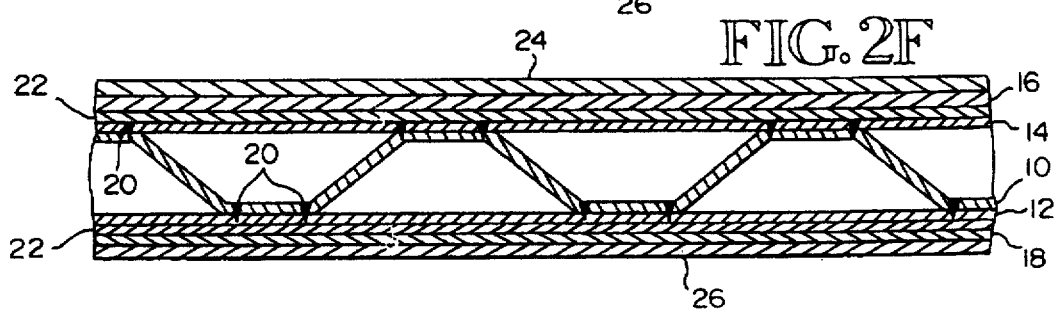

SUPERPLASTICALLY FORMED PART

REFERENCE TO RELATED APPLICATIONS

The present application is a divisional application based upon U.S. patent application Ser. No. 08/151,433, filed Nov. 12, 1993, now U.S. Pat. No. 5,420,400, a continuation-in-part application based upon U.S. patent application Ser. No. 07/777,739, filed Oct. 15, 1991, now U.S. Pat. No. 5,410,132 and is related to U.S. Pat. No. 4,622,445, which are incorporated by reference.

TECHNICAL FIELD

The present invention relates to a superplastically formed part made by an energy efficient and timesaving method for multisheet superplastic forming (SPF) and brazing in an induction heating workcell in a single heat cycle.

BACKGROUND OF THE INVENTION

Under certain conditions, some materials can be plastically deformed without rapture well beyond their normal limits, a property called superplasticity. This property is exhibited by certain metals and alloys, within limited ranges of temperature and strain rate. For example, titanium and its alloys are superplastic in the temperature range 1450°–1850° F. (787°–1010° C.).

Superplastic forming (SPF) is a fabrication technique that relies on superplasticity. A typical SPF process involves placing one or more sheets of metal or plastic in a die, heating the sheets to an elevated temperature within the superplastic range, and superplastically forming the sheet(s) at the SPF temperature. Generally, a differential forming pressure from a gas manifold is used to stretch the sheet(s) into the desired shape against the die surface(s). The differential pressure is selected to strain the material at a strain rate that is within its superplastic range. The following patents are illustrative of SPF processes and equipment:

| PATENT | TITLE | ISSUE DATE |
|---|---|---|
| 3,920,175 | Method of SPF of Metals with Concurrent Diffusion Bonding | November 18, 1975 |
| 3,927,817 | Method for Making Metallic Sandwich Structures | December 23, 1975 |
| 3,605,477 | Precision Forming of Titanium Alloys and the Like by Use of Induction Heating | September 29, 1971 |
| 4,141,484 | Method of Making a Metallic Structure by Combined Flow Forming and Bonding | February 27, 1979 |
| 4,649,249 | Induction Heating Platen for Hot Metal Working | March 10, 1987 |
| 4,117,970 | Method for Fabrication of Honeycomb Structures | October 3, 1978 |
| 5,024,369 | Method to Produce Superplastically Formed Titanium Alloy Components | June 18, 1991 |

These patents are incorporated by reference.

One advantage of SPF is that complex shapes can be formed from sheet-metal so the time and waste of milling are eliminated with great cost saving. In addition, the SPF process is generally applicable to single and multisheet fabrication. For multisheet fabrication, SPF is combined with joining processes, such as diffusion bonding or laser welding, to produce complex sandwich structures. One advantage of the SPF process is lighter, lower cost parts with fewer fasteners. A single part can replace the complex assembly currently required using conventional manufacturing operations. Common applications of SPF include the manufacturing of parts for aircraft, missiles, and spacecraft.

In a typical prior art SPF process for titanium or its alloys, the sheetmetal is placed between dies at least one of which has a contoured surface corresponding to the shape of the product. The dies are placed on platens which are heated, generally using embedded resistive heaters. The platens heat the dies to about 1650° F. (900° C.). Because the titanium will readily oxidize at the elevated temperature, an inert gas, such as argon, surrounds the die and workpiece. The dies heat the sheetmetal to the temperature range where the sheetmetal is superplastic. Then, under applied differential pressure, the sheetmetal deforms against the contoured surface.

The platens and dies have a large thermal mass. To save time and energy, they must be held near the forming temperature throughout a production run (i.e., the production of a number of parts using the same dies). The raw sheetmetal must be inserted onto the dies, and formed parts removed, at the elevated forming temperature. The hot parts must be handled carefully to minimize bending. Within the SPF range, the SPF metals have the consistency of taffy, so bending can easily occur unless precautions are taken.

As described to some degree in U.S. Pat. No. 4,622,445 and in copending U.S. patent application Ser. No. 07/777,739, we have discovered an improvement for an SPF process coupling the use of ceramic dies with inductive heating. With this SPF press or workcell, we can heat preferentially the sheetmetal workpiece with induction heating without heating the platens or dies significantly and can use the ceramic dies as an insulator to hold the induced heat in the part. We can stop the heating at any time and can cool the part relatively quickly even before removing it from the die. We do not waste the energy otherwise required to heat the large thermal mass of the platens and dies. We do not force the workers to work around the hot dies and platens. With our inductive heating workcell, we also save time and energy when changing dies to set up to manufacture different parts because the dies and platen are significantly cooler than those in a conventional SPF press. This change operation can be shortened by several hours.

U.S. Pat. Nos. 3,920,175 and 3,927,817 describe typical combined cycles for SPF forming and diffusion bonding. Diffusion bonding is a notoriously difficult and temperamental process that has forced many SPF fabricators away from multisheet manufacturing or to "clean room" production facilities and other processing tricks to eliminate the possibility of oxidation in the bond. Oxides foul the integrity of the bond. In addition, diffusion bonds are plagued with microvoids which are difficult to detect nondestructively, but, if present, significantly diminish the structural performance of the joint. Diffusion bonding also is a time consuming process. The part typically must be held at elevated temperature and elevated pressure (about 400 psi) for several hours. For example, in U.S. Pat. No. 3,920,175, the diffusion bonding operation takes five hours at 1650° F. (900° C.), making the forming/bonding operation six hours. In U.S. Pat. No. 3,927,817, diffusion bonding occurs prior to forming, still requires four to five hours, and forces a six hour bonding/forming cycle at 1650° F. (900° C.) for the entire period. Typically a hot press diffusion bonding process for common titanium alloys used in aerospace applications will require over eight hours at 2500 psi and 800° C. (1472° F.), about six hours at 400 psi and 900° C. (1650° F.), or about two hours at 250–300 psi and 950° C. (1742° F.). Producing this heat and pressure for this length of time is expensive.

The method used to make the SPF multisheet parts of the present invention is a timesaving process for an SPF/brazing cycle for multisheet parts that promises higher quality parts at lower production costs with significant energy savings in shorter production times. The troubles of diffusion bonding are eliminated by replacing diffusion bonding with brazing so that a much more efficient cycle is possible. Manufacturers have greater assurance in the integrity of the brazed bond, can achieve a satisfactory brazed bond quickly and reliably, and can process the multisheet pack with a single heating cycle without removing the pack from the press.

SUMMARY OF THE INVENTION

The present invention makes improved parts that are superplastically formed from multisheet packs and that include both weld joints between sheets and braze joints between sheets, each at separate selected locations, using a single heat cycle a combined method for superplastic forming (SPF) and brazing preferably using an induction heating SPF workcell like that described in U.S. Pat. No. 4,622,445 or U.S. patent application Ser. No. 07/777,739. The induction heaters cause the sheetmetal workpiece to heat but not the ceramic dies, leading to much shorter heating and cooling cycles as compared to the prior art technique of using resistive heaters and metal dies.

The preferred method for making the parts of the present invention, then, comprises the steps of assembling a pack of SPF sheetmetal sheets having braze alloy placed where braze joints will be located in the finished part, inductively heating the pack to the superplastic forming range, forming the pack to define the braze joints, increasing the temperature to reach the braze temperature or melting point of the braze alloy to allow the alloy to flow in the area of the braze joint, and cooling the part below the superplastic forming range.

BRIEF DESCRIPTION OF THE DRAWINGS

FIG. 2 A–F is a schematic cross-section of a preferred five-sheet pack and retort, illustrating the typical assembly process.

BEST MODE CONTEMPLATED FOR CARRYING OUT THE INVENTION

Combining in one thermal operation SPF forming with metallurgical joining of the individual sheets of a multisheet pack, generally using brazing, provides significant manufacturing cost advantage while reliably producing complex multisheet SPF parts. Typically, forming precedes brazing. Replacing diffusion bonding that is conventional in the art with a metallurgical bond or braze joint eliminates the uncertainties of structural integrity that worry manufacturers who rely on diffusion bonding. A metallurgical bond can be formed quickly and reliably at lower pressures and significantly shorter processing times.

Figure 1:
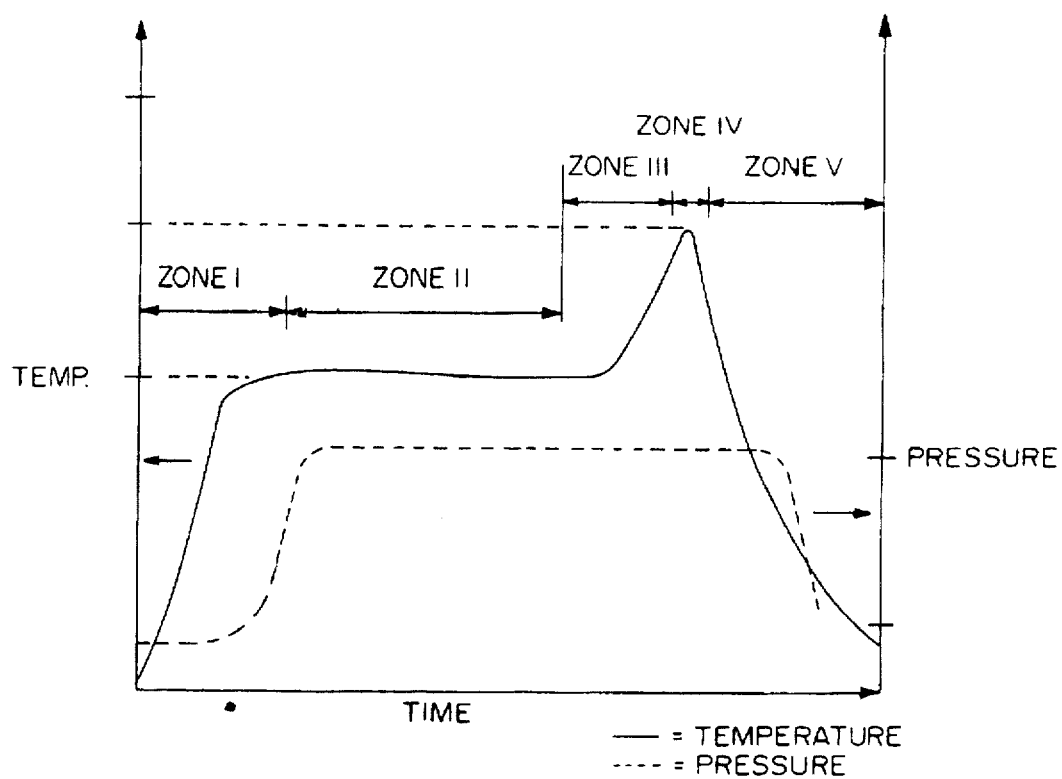
FIG. 1 is a typical, idealized pressure-temperature profiled for the combined inductive heating cycle of the present invention.

As shown in FIG. 1, the idealized temperature-pressure cycle for a preferred SPF/brazing process of the present invention includes five processing zones. In Zone I, the multisheet pack is loaded to the SPF workcell (i.e., "press") and is heated inductively to the superplastic forming temperature for the pack. In Zone II, the press's gas manifold and gas control system creates differential pressure as the driving force in the park to form the SPF parts with a preselected core cell geometry. In this step, the pack typically, has sheets that are expanded to form a web, truss, or "honeycomb" structure between outer facesheets which may be formed or that may remain flat, as appropriate for the particular part being manufactured. Those skilled in the art of SPF manufacturing will understand how particular parts can be designed and laid up into the packs with suitable gas zones to produce the desired final shape. We illustrate two multisheet pack-retort layups in FIGS. 2 and 3.

In Zone II, the SPF process also defines the location of braze joints in the finished part. When assembling the pack, braze alloy is affixed to one or more of the sheetmetal sheets in these areas. A braze alloy is selected that has a melting point higher than the SPF forming temperature of the pack sheetmetal so that the forming and brazing operations can be sequential in a single thermal cycle. Generally we use a braze alloy having a braze temperature about 150° F. (85° C.) above the SPF forming temperature when making titanium or titanium alloy parts.

After the SPF operation is complete, in Zone III, the pack is heated inductively to the higher melting point temperature of the braze alloy, and is held there briefly (Zone IV) to allow the alloy to melt and flow in the area of the braze joint. Finally, the heating is stopped and the part is allowed to cool (Zone V) below the SPF temperature, and the finished part is removed from the press.

Inductive heating is a significant advantage for this SPF/brazing operation because it permits rapid heating and cooling. As discussed in copending U.S. patent application Ser. No. 07/777,739 in greater detail, an inductive SPF press incorporates induction coils within the ceramic dies. Currents introduced through the induction coils couple electromagnetically with the metallic pack to heat the pack rapidly. The ceramic dies are a natural refractory material that has a low heat transfer coefficient. It is an effective thermal insulation. The induction only affects the metals within the pack and the dies hold the heat produced by induction in the pack. Energy is not wasted in heating a huge thermal mass otherwise typical for conventional SPF presses. While the pack might have a temperature of 1650° F. (900° C.), the ceramic dies will only heat to on the order of 150°–400° F. (66°–205° C.) and, preferably 150°–200° F. (66°–93° C.) remote from the forming surface. Hence, there are significant energy savings and the workplace is a safer and more pleasant environment.

The details of the forming/brazing operation of the present invention will next be discussed with reference to forming a four sheet titanium honeycomb part using Ti 6Al-4V alloy sheetmetal and TiCuNi (70:15:15) braze alloy. Such a part includes three sheets (10, 12, 14; FIG. 2) that constitute the core material and two face sheets 16 and 18 that sandwich the core material. The four sheets constitute "a pack."

The three sheets (10, 12 and 14) of the core material are welded 20 in selected locations to join them in a pattern appropriate to form the desired core cell geometry (i.e., web, tress, honeycomb, etc.). Typically the core material is about 0.20 in thick sheetmetal. Resistance or laser welding can be used. Stopoff material (i.e., a release agent) can be used wherever the core material sheets are not welded together, but we prefer to do without it. The core material is welded around essentially its entire periphery, leaving appropriate gas inlets for the forming gas/differential pressure.

Braze alloy ribbon (0.001 in thick) 22 is spot welded to the appropriate locations on the face sheets 16 and 18 where the core material and respective face sheet will contact in the finished part. Again, stopoff material can applied, if desired, at the remaining portions of the face sheets.

The core material is sandwiched between the face sheets with the braze alloy ribbons in contact with the corresponding locations on the core material where braze joints will be formed. The face sheets also are welded substantially around their periphery (leaving the gas inlets, of course) to complete the pack. We generally use an edge band doubler weld. The sheetmetal stock is oversized to accommodate the welds and to allow trimming to produce the final, finished part.

One vacuum line into the pack allows evacuation or pressurizing of the volume between the face sheets where the core materials lay. The differential pressure zones necessary for the SPF forming are also laid out at this time, as those skilled in the art will understand.

The pack is sandwiched, in turn, between two 1008 steel sheets 24 and 26 that are welded around their periphery (leaving appropriate gas inlets) to form a retort. The sheets of the retort are coated on their inner sides with a release agent like boron nitride to keep the part from sticking to the retort. The retort sheets are selected so that their Curie temperature is high enough to facilitate the forming and brazing operations. As those of ordinary skill understand, the Curie temperature is an indirect measure of the susceptibility of the material to heating with induction, so a judicious selection of the retort sheet material is necessary. For titanium we use 1008 steel. For aluminum we us 1100 aluminum alloy.

The weld around the retort sheets defines an internal volume or cavity for the pack. At least one gas line permits evacuation or pressurizing this volume which surrounds the pack. Typically we purge both the retort cavity and the pack cavity with argon gas or another suitable inert atmosphere.

The retort usually is coated with boron nitride and EVER-LUBE on its outer surfaces to ensure that the retort does not stick to the dies.

The retort is loaded into the SPF press and the gas lines are connected. Induction heating is used to rapidly ramp up the temperature of the retort and pack until they reach SPF forming temperature of about 1650° F. (900° C.). With our press, we can heat the part at a rate of about 165° F./min (92° C./min) so this heating step (Zone I in FIG. 1) takes about 10 min. During this heating stage, we prefer to purge the pack cavity with argon.

At the forming temperature, the pressure ramp up (FIG. 1, Zone II) is used to apply the differential pressure that will form the part. The differential pressure and the forming temperature are maintained for the proper time (typically 40 min) while the part stretches superplastically into the configuration of the die and the core material expands to define the desired core material cell geometry and locations of the braze joints where a face sheet and core material sheet sandwich a braze alloy ribbon. The differential pressure ensures that this sandwich brings the core material into intimate contact with the braze alloy ribbon.

With SPF forming complete, the power to the induction coil is increased to induce an increase in temperature in the retort and the temperature is ramped up (FIG. 1, Zone III) quickly at a rate of about 100° F./min (55° C./min) to the braze temperature (melting point) of the braze alloy, here about 1850° F. (1010° C.). The ramp up should be as rapid as possible, while maintaining thermal uniformity. Radiant heat transfer from one hotspot on the part to a cooler neighboring location and convection in the cavities helps to maintain this uniformity.

Once the braze alloy melts (i.e., the melting point is reached), the temperature can be brought down immediately, because sufficient flow will occur in the braze joint to ensure a quality bond. We turn off the induction coils at this point and achieve a cooling rate (FIG. 1, Zone V) of about 60° F./min (33° C./min). In this Zone, we reduce the differential pressure as well. When the retort cools below the superplastic forming range (and usually to about 600° F. (315° C.) or below), we remove the retort from the die. At 600° F. (315° C.), the part will have good strength and the risk of warping or other distortion when the retort contacts ambient air is significantly reduced.

We cut away the retort leaving the finished four sheet part for trimming and fitting.

The ceramic die faces usually are coated with a release agent as well to keep the retort from sticking to the die.

While our detailed example is about Ti-6Al-4V alloy, titanium and its other SPF alloys (like Ti-15-3-3-3-3), aluminum and its SPF alloys, stainless steel, or other SPF metals can readily be used in the combined SPF/brazing thermal cycle.

Although the braze alloy in our example melts above the β-transition for titanium, the parts we wish to make require a β-transition annealing, so this fact is not a disadvantage. It may be a concern, however, with the fabrication of other parts. This fact along with performance issues will drive the braze alloy selection.

A metal matrix composite (MMC) film or sheet can also be brazed to the inner or outer surfaces of the face sheets of the pack in this combined forming/brazing cycle. For example, we might form a pack with two Ti-6Al-4V sheets for the core material brazed to two 0.031 in thick titanium MMC sheets that sandwich the core material and that in turn are bonded to outer face sheets of Ti-15-3-3-3-3. Suitable Ti MMCs are being developed by 3M and are described in our quarterly technical report for September, 1992, then November, 1992, under Contract No. MDA972-90-C-0018, Subcontract GS00347-KAS for ARPA. Making these products in the induction cycle we propose here improves them because they are exposed to elevated temperatures for a shorter time, thereby reducing the interaction of the reinforcing fibers with the matrix metal.

Figure 4:
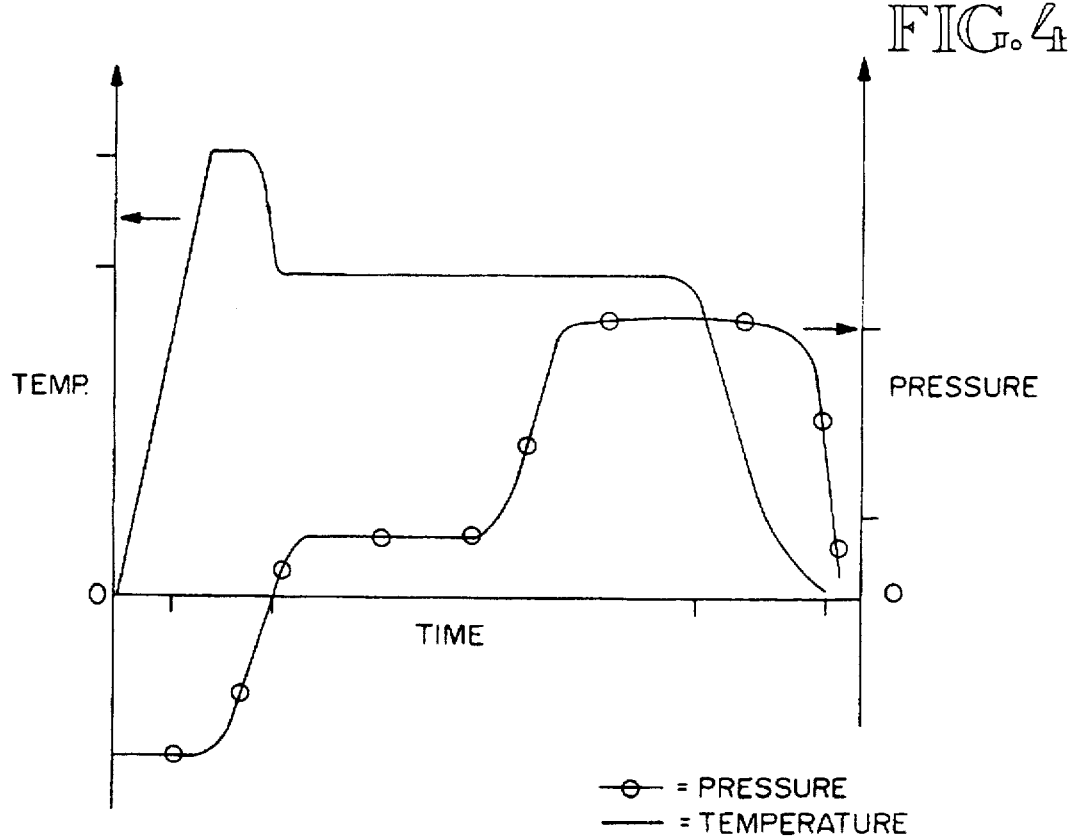
FIG. 4 is an idealized pressure-temperature profile for a combined cycle in which brazing precedes the forming operation.
Figure 3A:
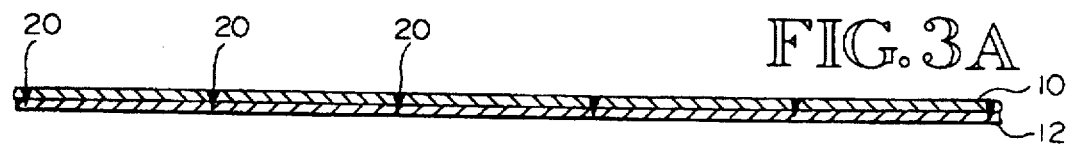
FIG. 3 A–F is a schematic cross-section of a preferred four-sheet pack-retort, illustrating the typical assembly process.
Figure 3B:
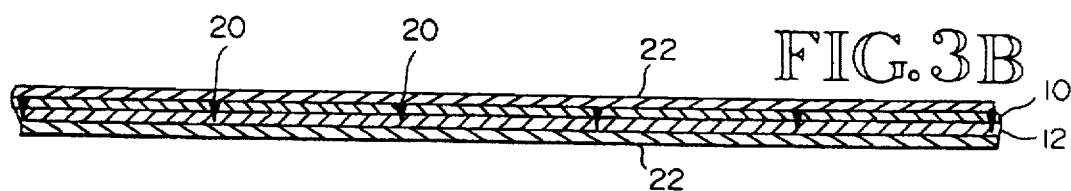
Figure 3C:
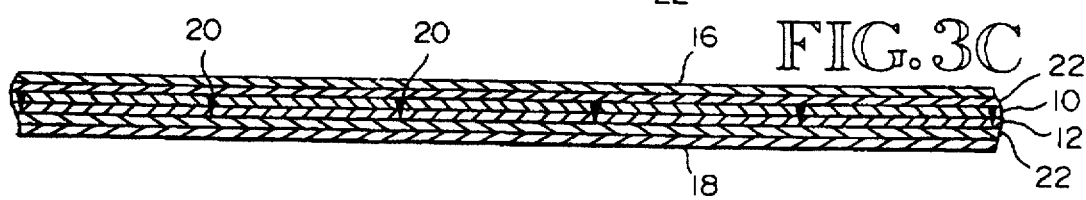
Figure 3D:
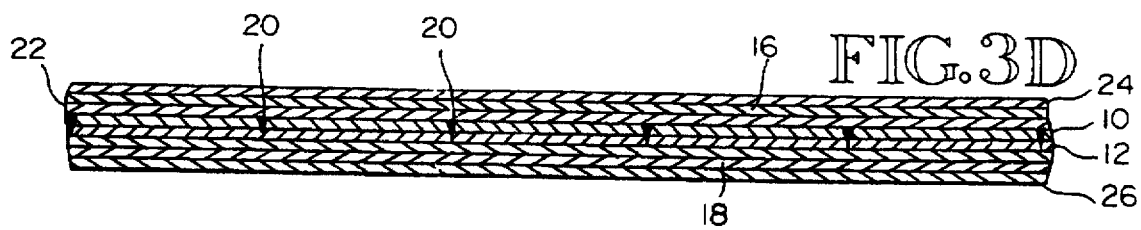
Figure 3E:
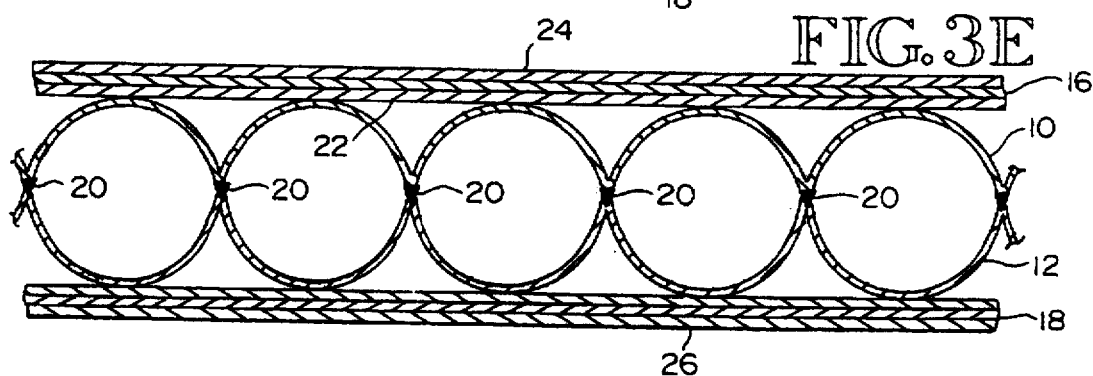
Figure 3F:
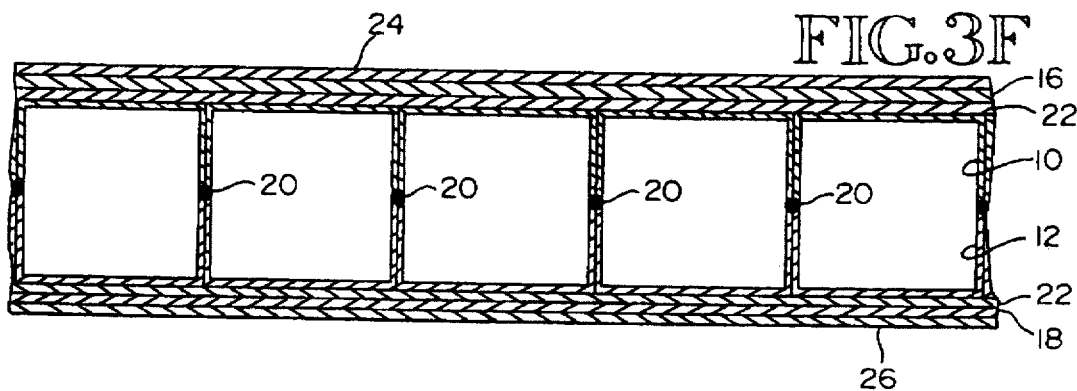

Of course, the brazing step can precede the forming step as schematically illustrated with the temperature-pressure profile of FIG. 4. There, the solid line represents the temperature profile and the -0- line the pressure. The temperature scale is on the left and the pressure scale on the right. If brazing precedes forming, stopoff material needs to be applied everywhere at metal metal interfaces where braze joints will not be located. Brazing first, however, can improve the fatigue characteristics. Forming a braze fillet before SPF expansion seems to strengthen the finished part.

While this description has discussed only the forming of a braze joint using a braze alloy, those skilled in the art will recognize that the process is equally well suited to forming enhanced metallurgical bonds. Therefore, for this application, unless otherwise restricted to brazing, the terms "braze alloy" and "braze joint" should be interpreted to encompass the corresponding enhanced metallurgical bonding (EMB) concepts. Enhanced metallurgical bonds use a coating or thin foil to create, in combination with the base metal, a liquid interface at the joint when the EMB foil is activated at elevated temperature.

While preferred embodiments have been described, those skilled in the art will recognize modifications or variations which might be made without departing from the inventive concept. Therefore, the description and claims should be interpreted liberally with only such limitation as is necessary in view of the pertinent prior art.

I claim:

1. A superplastically formed part, comprising a product obtained, in a single heat cycle, by sequentially superplastically forming a part and forming braze joints within the part at selected locations, by (a) welding together at selected locations at least two sheets of a pack having a plurality of sheets of sheetmetal to form a desired core cell geometry for the part and including braze alloy in the pack between selected sheets at appropriate locations where braze joints will join the adjacent sheets in the part, the sheetmetal exhibiting superplasticity in a superplastic forming temperature range;

(b) inductively heating the pack in a press to the superplastic forming temperature range but to a temperature below the melting point of the braze alloy;

(c) superplastically forming the pack at the superplastic forming temperature range including forming the desired core cell geometry in the part by expanding sheets welded together in step a;

(d) inductively increasing the temperature after superplastic forming form the superplastic forming temperature range to the melting point of the braze alloy to flow the braze alloy in each braze joint and to initiate brazing at the selected locations;

(e) cooling the part below the superplastic forming temperature range to complete braze joints at the selected locations; and (f) thereafter removing the part with the braze joints from the press.

2. The part of claim 1 wherein the sheets are titanium or a titanium alloy and wherein forming occurs at about 1650° F. (900° C.).

3. The part of claim 2 wherein the melting point of the braze alloy is at least about 1850° F. (1010° C.).

4. The part of claim 3 wherein the braze alloy includes titanium, copper, and nickel.

5. The part of claim 3 wherein the pack includes at least five sheets of sheet metal.

6. A superplastically formed part made by:

(a) welding together a pack from a plurality of titanium or titanium alloy sheets to form a desired core cell geometry for the part and including a 70% titanium: 15% copper: 15% nickel braze alloy in the pack at appropriate locations where braze joints will join adjacent sheets;

(b) inductively heating the pack in a press to the superplastic forming range of about 1650° F. but to a temperature below the melting point of the braze alloy;

(c) then, superplastically forming the pack including forming the desired core cell geometry in the part by expanding the sheets welded together in step (a);

(d) inductively increasing the temperature after superplastic forming from the superplastic range to the melting point of the braze alloy at a temperature of at least about 1850° F. to flow the braze alloy in each braze joint and to initiate brazing at the selected locations;

(e) cooling the part below the superplastic forming temperature range to complete braze joints at the selected locations; and, (f) thereafter removing the part with the braze joints from the press.

7. The part of claim 6 wherein sheets welded in step (a) are at the inside of the pack and wherein the braze alloy is between outer facesheets of the pack and the welded sheets.

8. A superplastically formed part obtained in a single heat cycle by forming a multisheet part having weld joints and braze joints at selected locations, the part being made in a process comprising the steps of:

(a) assembling a pack of a plurality of flat sheets of a sheetmetal having brazing alloy affixed to at least one of the sheets at selected locations corresponding to the location of braze joints in the part, at least two sheets in the pack being welded together at selected locations to define, after superplastic forming, an expanded core geometry in the part, the sheets being suitable for superplastic forming at a superplastic forming temperature range;

(b) loading the pack to a press for superplastically forming the sheetmetal;

(c) heating the pack to a temperature within the superplastic forming temperature range;

(d) superplastically forming the pack to define the expanded core geometry for the part between said selected locations and to define the braze joints;

(e) while retaining the pack in the press, increasing the temperature of the pack from the superplastic forming temperature range to a higher temperature at which the brazing alloy melts to allow the brazing alloy to flow in the locations of the braze joints;

(f) cooling the pack below the superplastic forming temperature range to freeze the brazing alloy in the braze joints and to complete the part; and (g) removing the part from the press after the cooling step.

9. The part of claim 8 wherein the temperature for superplastic forming is about 1650° F., the brazing alloy melts at about 1850° F., and the sheets are selected from the group consisting of titanium and titanium alloys.

* * * * *